United States Patent [19]

Pedersen et al.

[11] 4,308,754
[45] Jan. 5, 1982

[54] ULTRASONIC FLOWMETER

[75] Inventors: Norman E. Pedersen, Newburyport; James E. Bradshaw, Tyngsboro; James E. Matson, Brookline; Lawrence C. Lynnworth, Waltham, all of Mass.

[73] Assignee: Panametrics, Inc., Waltham, Mass.

[21] Appl. No.: 86,402

[22] Filed: Oct. 19, 1979

[51] Int. Cl.³ .............................................. G01F 1/66
[52] U.S. Cl. ................................................ 73/861.28
[58] Field of Search ................ 73/861.27, 861.28, 597, 73/290 V

[56] References Cited
U.S. PATENT DOCUMENTS

| | | | |
|---|---|---|---|
| 3,486,377 | 12/1969 | Franchi | 73/290 V |
| 3,697,936 | 10/1972 | Zacharias, Jr. et al. | 73/597 |
| 3,818,757 | 6/1974 | Brown | 73/861.28 |
| 3,869,915 | 3/1975 | Baumoel | 73/861.28 |
| 3,894,431 | 7/1975 | Muston et al. | 73/861.29 |
| 4,014,211 | 3/1977 | Araki et al. | 73/861.27 |

Primary Examiner—Charles A. Ruehl
Attorney, Agent, or Firm—Kenway & Jenney

[57] ABSTRACT

An ultrasonic flowmeter for determining fluid flow velocity within a conduit by determining the difference in transit time between interrogating ultrasonic pulses transmitted upstream between a pair of transducers and transmitted downstream between them. A high frequency clock pulse operating for one or more cycles of interrogation allows for accurate digital computation.

8 Claims, 7 Drawing Figures

ULTRASONIC FLOWMETER

BACKGROUND OF THE INVENTION

This invention relates in general to ultrasonic flowmeters and more particularly to circuitry for precise determinination of the differences in transit time of ultrasonic wave propagation upstream and downstream within a fluid flowing in a conduit.

One method of determining the velocity of flow of fluids within a conduit utilizing ultrasonic wave transducers has been to place a pair of transducers apart in the direction of flow and to determine the difference in propagation time of ultrasonic waves between these transducers in the upstream direction and the downstream direction. The flow velocity of the fluid, of course, adds to the sound velocity in the downstream direction and substracts from it in the upstream direction. One effective technique for accomplishing this measurement is known as the singaround method. In this method an ultrasonic wave is initiated at one of the transducers and is transmitted to the other transducer, for example, in the upstream direction. Upon receiving this transmitted ultrasonic wave, the second transducer generates an electrical signal, which is used to again trigger the propagation of an ultrasonic wave from the first transducer. This process is repeated and the repetition frequency of the output signals from the first transducer then corresponds to the transit time of ultrasonic waves passing from the first transducer to the second transducer. When the same technique is used will respect to ultrasonic waves propagated in the opposite direction, a pair of frequencies result, with the difference between the frequencies being a measure of the difference between the upstream propagation velocity of the ultrasonic wave and the downstream propagation velocity, hence a measure of the flow velocity of the fluid. The following U.S. Patents are examples of these prior art techniques, U.S. Pat. Nos. 2,746,291; 3,237,453; 3,869,915 and 3,812,098.

One problem with this technique is the problem of accurate measurement of a small difference in frequency. Other problems arise from reverberation effects in the conduit or fluid or ultrasonic transducers themselves rendering it still more difficult to obtain a precise measure of the difference in frequencies. Additionally, the presence of substantial material, such as buffer rods, between the transducers and the fluid leads to inaccuracy in correcting the frequency difference to fluid velocity.

SUMMARY OF THE PRESENT INVENTION

Broadly speaking, in the present invention a technique is employed for precise determination of the difference in propagation velocity of ultrasonic waves in upstream and downstream directions in order to provide accurate determination of flow velocity within a conduit. In this approach, as in the sing-around approach, a pair of transducers are placed apart in the direction of flow along a conduit. An ultrasonic wave is initiated at the upstream transducer. Its reception at the other transducer is used as a measure of the period, or transit time between the pair of transducers in the direction of initial propagation. In the present invention this transit time is accurately determined by means of a relatively high frequency time clock measuring a number of these periods. The transit time for waves transmitted in the opposite (upstream) direction is similarly measured. The difference in transit times then provides for a highly accurate measure of flow velocity, capable of compensating for material interposed between transducer and the flowing fluid, as well as for reverberations and ringing within the physical apparatus.

For a typical ultrasonic flowmeter configuration employing reciprocal transducers, the flow velocity V along the interrogated fluid path P may be computed from the times of flight $t_1$ and $t_2$ measured between the two transducers:

$$V = \frac{c^2 \Delta t}{2L} = \frac{2P^2}{L} \frac{t_2 - t_1}{(t_1 + t_2 - 2t_w)^2} \quad (1)$$

where $L$ = axial projection of path in the flowing fluid, and $t_w$ = sum of all nonfluid path delays (e.g., windows in front of transducers, cable delays, electronic delays).

Equation (1) given for V above, is an approximation that is applicable to the extent that $V^2 << c^2$. In gas flows, and in some two-phase fluid flows where c is small (c on the order of 100 m/s in water containing a few percent volume concentration of air bubbles, for example, as found by H. Karplus and reported by R. W. B. Stephens (ed.) in the book Underwater Acoustics, p. 8, Wiley-Interscience (1970)) it is not uncommon for the Mach No. V/c to approach unity. When V is not sufficiently small compared to c, a more exact expression is required, to properly and accurately relate V to the t's.

In one derivation the downstream time is, $$t_1 = \frac{L}{c + V} + T_a + T_b = \frac{L + (T_a + T_b)(c + V)}{c + V} \quad (2)$$

and the upstream time is, $$t_2 = \frac{L}{c - V} + T_a + T_b = \frac{L + (T_a + T_b)(c - V)}{c - V} \quad (3)$$

where $T_a = L'/c$ = time delay in non-flowing liquid or in liquid in which the interrogating wave is orthogonal to the flow, and $T_b = L_m/c_m$ = time delay in nonfluid (e.g. metal window) portions of the path. It can be shown that, $$\frac{1}{t_1} - \frac{1}{t_2} = \frac{2V}{L\left\{\left[1 + \frac{c}{L}(T_a + T_b)\right]^2 - \left[\frac{V}{L}(T_a + T_b)\right]^2\right\}} \quad (4)$$

from which the flow velocity is obtained as, $$V = (1/t_1 - 1/t_2)(L)\{[l + L'/L + (L_m/L)(c/c_m)]^2 - [(L'/L)(V/c) + (L_m/L)(V/c_m)]^2\} \quad (5)$$

Furthermore, the temperature depedence of the c's may be introduced as $$c = c_o + \frac{dc}{dT} \Delta T, \quad (6)$$

$$c_m = c_{om} + \frac{dc_m}{cT} \Delta T \quad (7)$$

and the dimensional changes likewise may be introduced, since $$L = L_o(l = \alpha \Delta T) \quad (8)$$

where $\alpha$ = thermal expansion coefficient. Values for $dc/dT$ are given in the literature, e.g., in Mason's book Piezoelectric Crystals and Their Applications to Ultrasonics, p. 338, Van Nostrand, Princeton, N.J. (1950); and in Handbook of Chemistry. Values for $dc_m/dT$ are given or cited in Mason and Thurston (ed.), Physical Acoustics, Vol. 14, pp. 407–525, Academic Press, N.Y. (1979).

The flow velocity V may be converted to $\overline{V}$, the area averaged flow velocity, by utilizing area averaging cells or paths in which V very nearly equals $\overline{V}$; multichord quadrature weighting; simple arithmetic averaging of off-diameter paths inclined so their L's provide the required weighting; or use of theoretical meter factor $K=\overline{V}/V$ (e.g., for smooth pipes, $K=0.750$ for laminar flow, $K\approx 0.85$ for transitional flow, and $K=1/(1.119-0.011 \log Re)$ for $Re>4000$.

Transducers are not always reversible or reciprocal. Thus, under no-flow (V=0), $t_1 \neq t_2$, or $t_1-t_2=\Delta t$ at zero flow. This $\Delta t$ appears to be due to minor differences in electrical impedance terminations, size or other differences between transducers, and possibly other factors. If flow can be reduced to zero, $\Delta t$ can be measured by effectively interchanging transmitter and receiver cables. This can be done manually, or preferably, electrically so V will not change during the time that cables are being interchanged. This operation may be denoted "cable configuration switching" and is to be distinguished form the conventional upstream-downwstream transposition. By alternating which direction is upstream and which is downstream, average of V and −V can determine offset.

In one preferred embodiment, a comparison between the transit time between transducers and the period of one cycle of the output of a voltage controlled oscillator is made with the resultant difference signal used to control the voltage controlled oscillator until, after repeated ultrasonic transmissions, the frequency of the voltage controlled oscillator is such that its period is equal to twice the transit time of the ultrasonic waves.

In this arrangement it is the output from the voltage controlled oscillator which can initiate the repetition pulses of ultrasonic waves from the transducer. In fact, the period of the voltage controlled oscillator need not be equal to twice the transit time between transducers, but may instead be made proportional to it so that the voltage controlled oscillator is operating at either a higher frequency so that its cycle period is a precise rational fraction of the transit time between transducers, or may be operated at a lower frequency so that its cycle period is an exact multiple of this transit time. In this technique, however, it is not the frequency which is measured, but rather the elapsed time of a number of cycles of the oscillator. This is accomplished by generating at a relatively high repetition rate a train of timing pulses, at least one order of magnitude higher than the interrogation frequency, and measuring the total accumulated number of these timing pulses over a number, N, periods of the oscillator output. This technique very substantially reduces the error in determination of the flow of velocity.

If response time is unimportant, the number of periods, N, can be selected to be a convenient, large fixed integer, say 1024, appropriate for the measurement of the flow of many liquids having sound speeds ranging between 300 and 3000 m/s, or gases having sound speeds from, say, 100 to 1000 m/s. For faster response, a small N is selected, e.g., 32, 64, or 100. In contrast to the prior art wherein N was adjusted to compensate for variations in sound speed, the present invention compensates for sound speed through synchronism, and instead uses N as a means for selecting or optimizing response time and resolution.

By operating the circuitry in precisely the same fashion for waves propagated in the opposite direction in the conduit, for the same number, N, of periods of the oscillator output, a second number of pulses, which is a direct measure of N transit times in this flow direction is produced. The difference in the number of counts is then a precise indication of the flow velocity within the conduit. Since, as above indicated, the frequency of generation of ultrasonic waves from the transducers, in this technique can be higher or lower than the actual transit time, it is possible to establish periods long enough so that reverberations are in the wrong time frames to present any confusion to the determination of the transit times.

DESCRIPTION OF THE DRAWINGS

IN THE DRAWING

Figure 1:
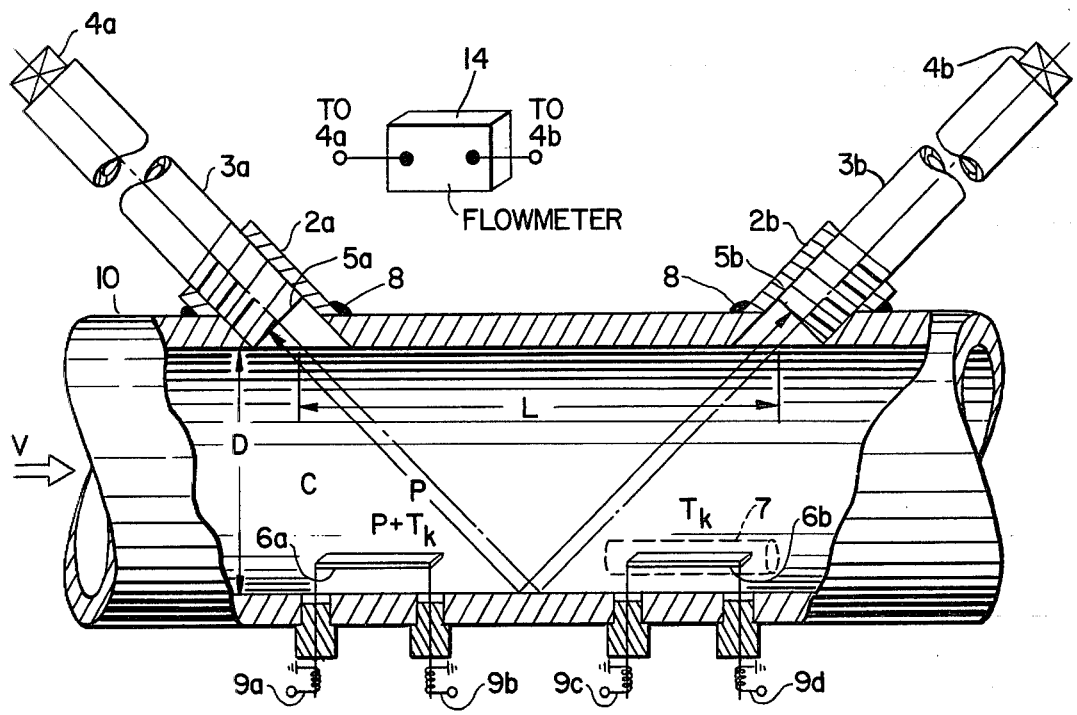
Figures 2A, 2B:
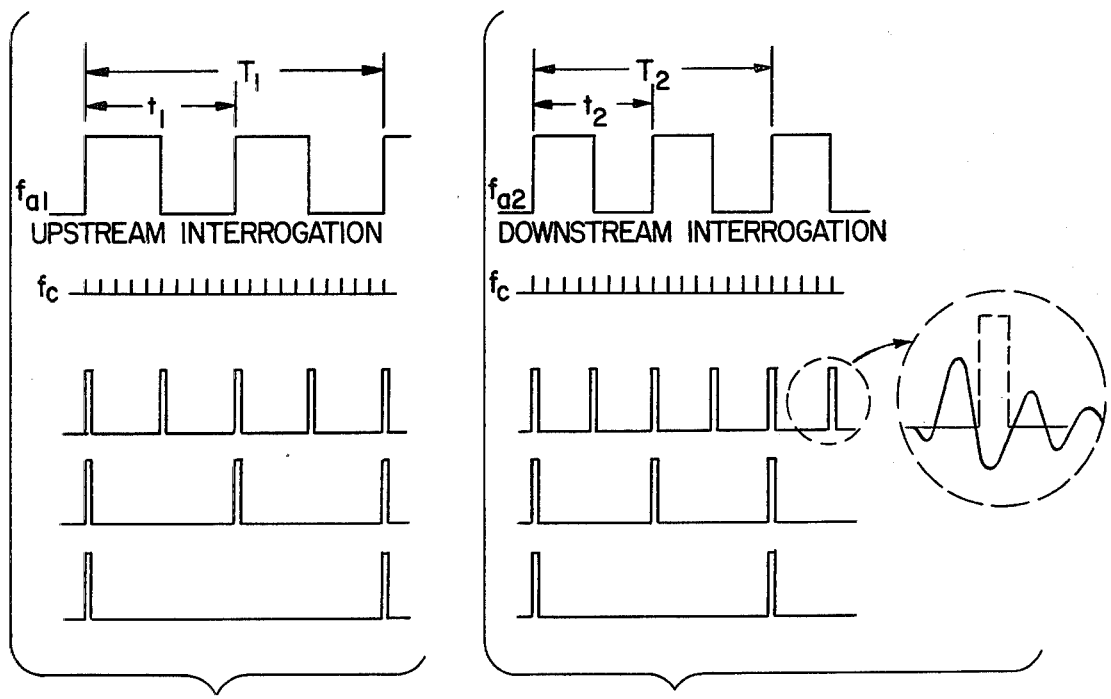
Figure 3:
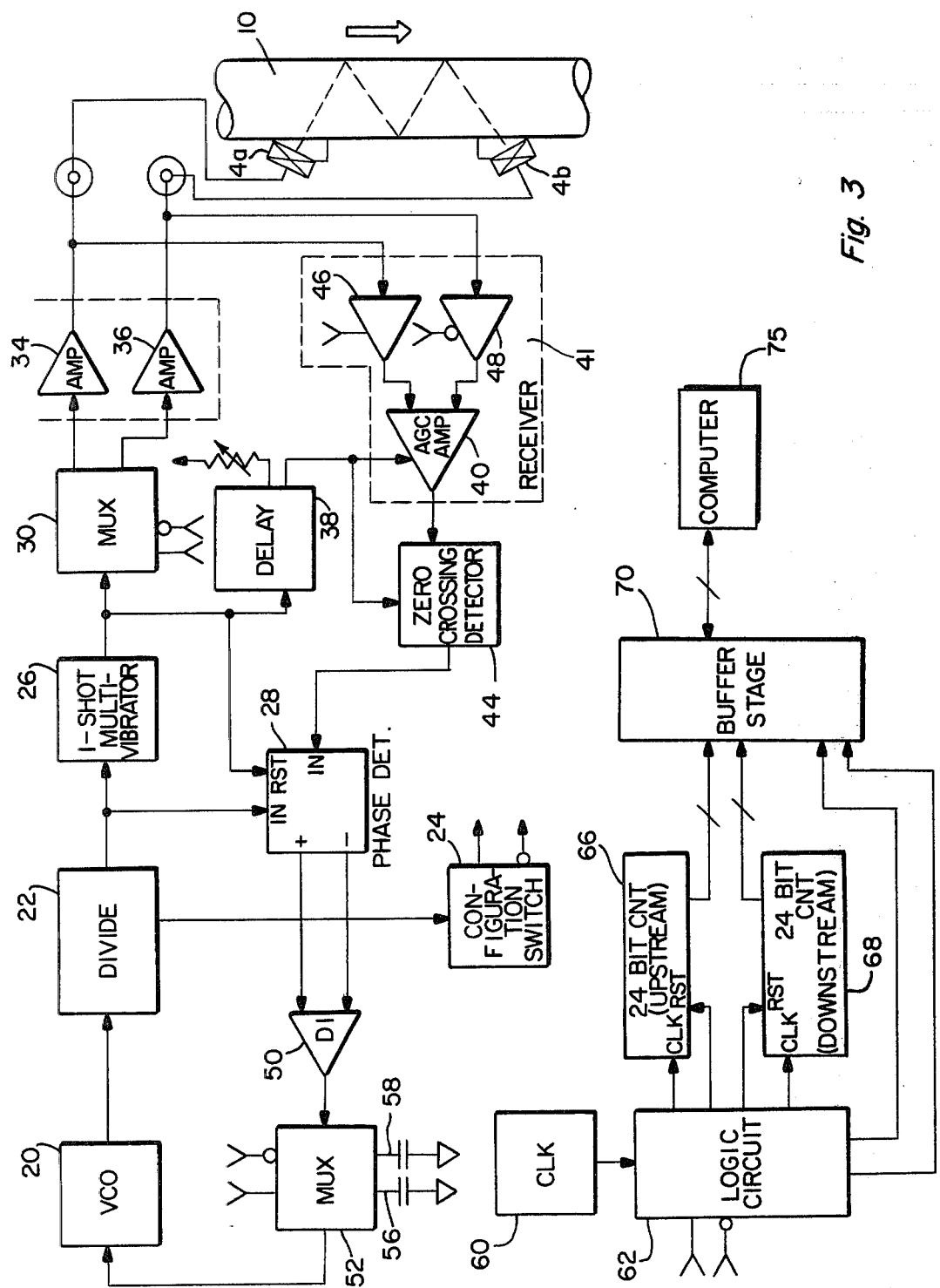
Figure 4:
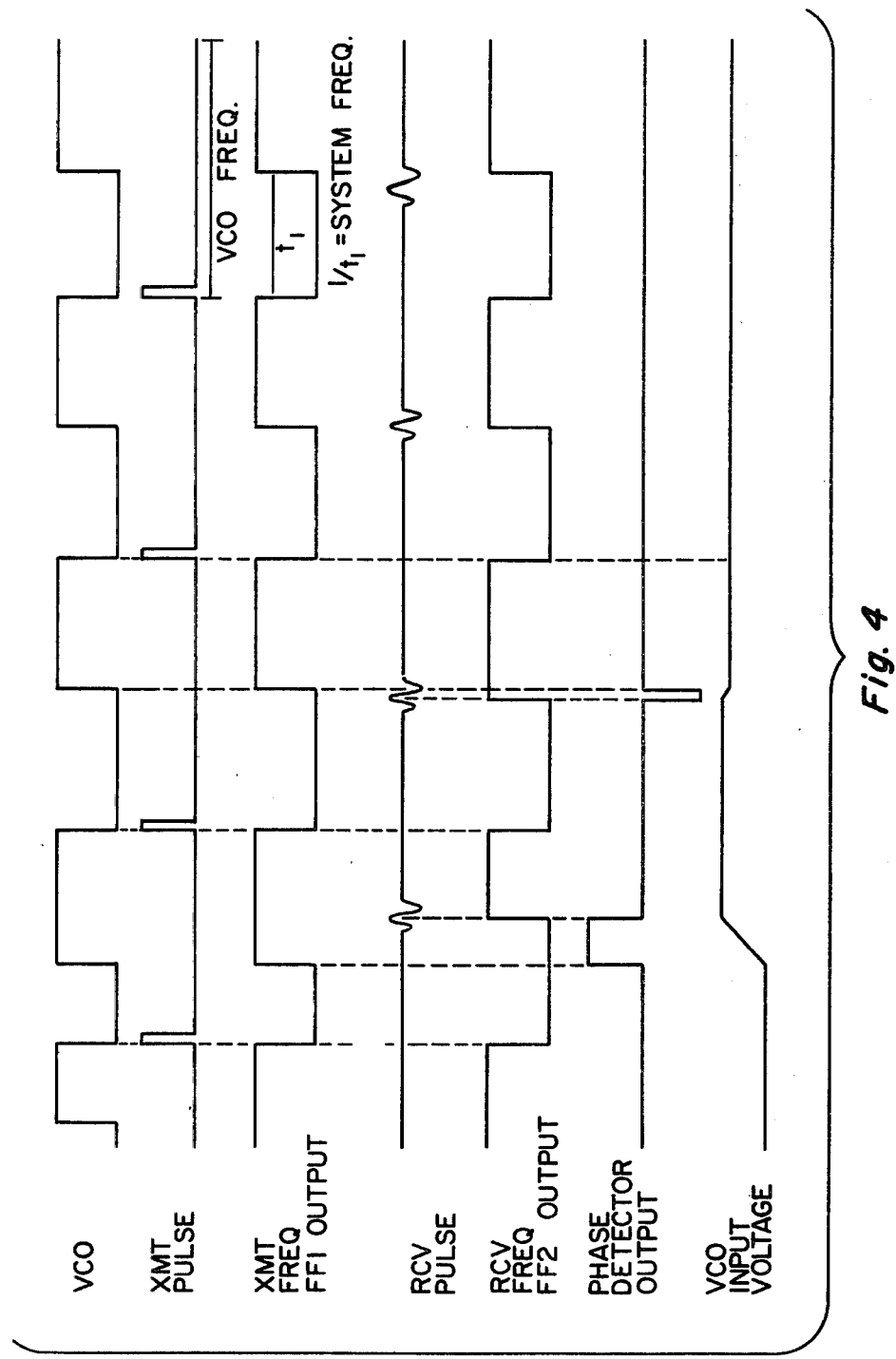
Figure 5:
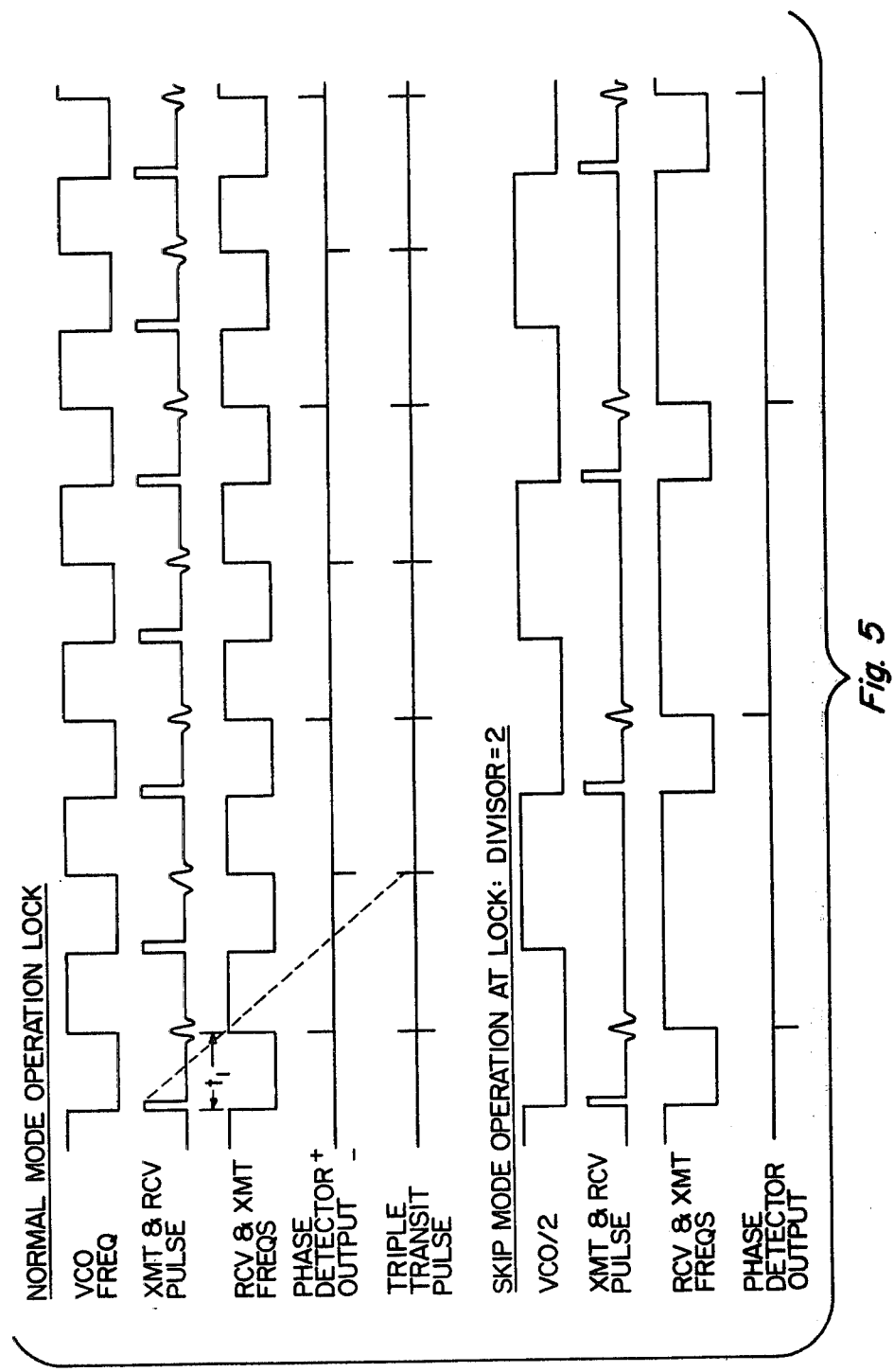
Figure 6:
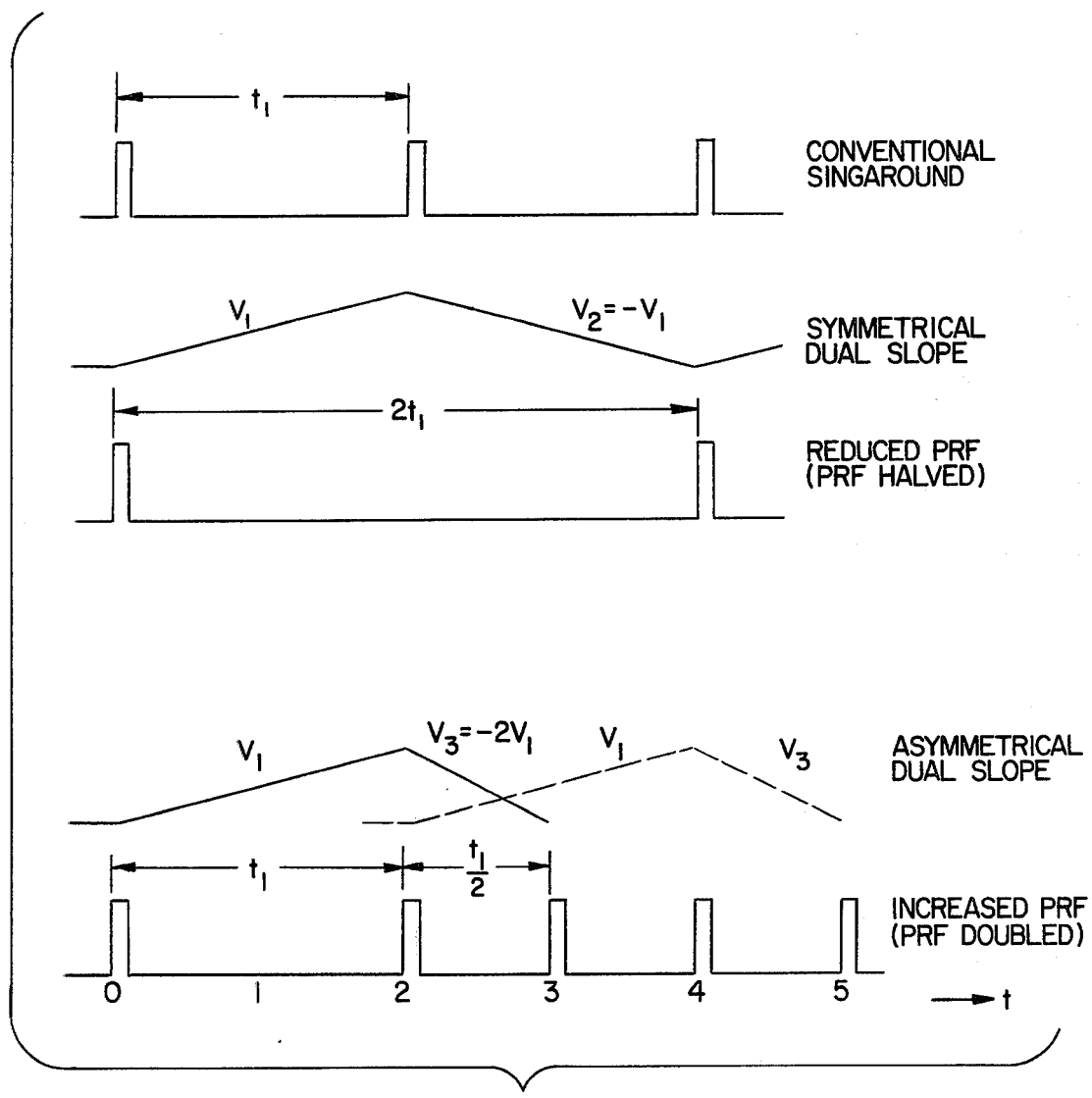

FIG. 1 is a generally perspective view, having cutaway portions, illustrating the physical configuration of a flow meter constructed in accordance with the principles of this invention;

FIGS. 2a and 2b are waveform timing diagrams illustrating operations of the flowmeter of FIG. 1;

FIG. 3 is an illustration in block diagrammatic form of the circuitry suitable for use in conjunction with the apparatus of FIG. 1;

FIGS. 4 and 5 are timing diagrams explanatory of the operation of the circuitry of FIG. 3; and FIG. 6 is a group of waveforms illustrating alternative timing waveforms for operation of the system of FIG. 1.

DESCRIPTION OF PREFERRED EMBODIMENTS

FIG. 1 shows one form of a flow cell with transducers 4a and 4b coupled to buffer rods 3a and 3b which are installed in threaded nipples 2a and 2b welded to the pipe 10. The transducers are cable-connected to flowmeter electronics 14. The pipe 10 has an inside diameter D, an area $A=\pi D^2/4$, and provides an axially-projected path length L between the wetted ends 5a and 5b of the buffer rods, and a fluid path P along tilted diameters. The fluid at rest has a sound speed c, and flows at a velocity V as measured along path P. The pipe 10 also is penetrated by thin rod waveguides connected to torsional mode sensors 6a and 6b. Sensor 6b is encased in a hermetically sealed sheath 7. Pipe wall penetrations are sealed by compression fittings 8 which are of conventional design and so are not detailed. The purpose of the optional torsional sensors is to sense fluid density and/or temperature.

In FIGS. 2a and 2b, there are shown several timing diagrams. Those in FIG. 2a pertain to upstream ultrasonic interrogation waveforms, while those in FIG. 2b pertain to the downstream interrogation. The timing diagrams illustrate the interrogation repetition rate at which ultrasonic waves are emitted from the transducers 4a and 4b as well as timing pulses employed to measure the period of these interrogation signals over several cycles. Turning to FIG. 2a the squarewave of audio frequency $f_{al}$ represents the repetition rate for upstream interrogation, whose period $t_1$ is to be measured. To achieve high accuracy, the system employs a clock frequency $f_c$ which is in the ultrasonic range, i.e., $f_c >> f_{al}$. The number of clock pulses counted during $t_1$ is $t_1 f_{c\pm1}$. To reduce the fractional error due to the $\pm1$ uncertainty, $f_c$ can be increased or the count can be extended for a longer time than $t_1$, for example, for $Nt_1$, where N is an integer greater than 1, and usually much greater than 1. In this illustration, by way of example, $N=2$, so that the counting interval $T_1 = 2t_1$. If the same counting multiplier N is used in downstream interrogation, then $t_1 - t_2$ can be determined by counting at the $f_c$ rate for intervals $T_1$ and $T_2$.

As is well known in the flowmeter art, flow velocity V cannot be measured accurately, in general, by merely measuring $\Delta t = t_1 - t_2$, since V is proportional to $c^2 \Delta t$. In the present invention, c may be determined from P and the times of flight in the fluid. For many gases, and some liquids, c may also be determined from the temperature of the fluid. Or, as indicated by Equation (5), c can be eliminated by computing V from suitably corrected time reciprocals, when $L_m$ and $L'$ are relatively small compared to L.

By choosing a large N, the $\pm1$ uncertainty in the measured counts is rendered insignificant. The time required to make such measurements, again, is $N(t_1+t_2)$ or some multiple of this time if more than one pair of interrogations upstream and downstream are averaged. If a given time is allotted to making a V determination, as may be imposed by dynamic flow considerations and a corresponding short response time, there are several ways that the $\pm1$ uncertaintly associated with the single clock tick of frequency $f_c$ might be reduced. These ways include: use a clock of higher $f_c$; use 2 clocks of slightly different frequencies $f_{c1}$ and $f_{c2}$ in a vernier mode; or use but one clock, but supplement it with an analog interpolation circuit.

The analog interpolation circuit operates as follows. If a time interval $t_1$ is to be measured between start and stop events at $t_p$ and $t_q$, in general, $t_p$ will follow one of the clock ticks by a fraction of a clock period $t_{cp}$, and $t_q$ will precede a later clock tick by $t_{qc}$. The integer number of clock ticks will thus be the nearest whole number of ticks less than $f_c(t_1) = f_c(t_q - t_p)$. The "missing" time that should be added to the integer number of ticks times the clock period may be obtained by using a current source which charges a capacitor between $t_p$ and the first clock tick counted, and then is enabled to resume charging between the last tick counted and $t_q$. If the charge rate is adjusted to one volt per clock period, i.e., $f_c$ volts/s, then the voltage $V_c$ on the capacitor may be taken as a measure of the "missing" time. $V_c$ may be read with a digital voltmeter and added to the time obtained from the whole number of clock ticks, to obtain a better measure of $t_1$ than the clock alone could provide.

In addition to this technique of determining the cycle periods $t_1$ and $t_2$ by measuring them with a high frequency clock for several cycles, improved accuracy can also be obtained by choosing optimum pulse repetition frequencies (prf) for interrogation.

In some cases where the interrogation path is long ($\gtrsim 1$ m), it may be advantageous to interrogate more frequently than the reciprocals of the times of flight $t_1$ and $t_2$. In a conventional singaround system, this occurs if the sought response time $t_r$ is less than the sum of the times of flight. However, in the majority of cases, the times of flight are much shorter than the required response time. Therefore, the conventional singaround frequencies are usually high enough. In some instances these frequencies may be too high, however, for optimum accuracy. If the transducer ringdown or fluid path reverberations take longer than $t_1$ to decay 40 dB below the received signal, it can be shown that using a prf=$1/t_1$ leads to an uncertainty in the time of arrival of a pulse of about 1% of the period of the interrogating pulse. That is to say, if 1 MHz pulses are used, the time uncertainly could be as large as several ns. While several acoustic means of minimizing transducer ringdown or fluid path reverberations may be utilized, such means may not be totally adequate. The remedy possible with the present invention is to divide the reciprocal of the transit time by a sufficiently large integer M such that the resultant prf has a period longer than the time for ringdown or reverberations to decay to an acceptable small fraction of the received signal, e.g., 40, 50, or 60 dB down. M may be expected to lie in the range 2 to 100.

In FIG. 3 there is illustrated in block diagrammatic form suitable circuitry for the flowmeter electronics illustrated in FIG. 1. In the circuit of FIG. 3, a voltage controlled oscillator (VCO) 20 provides its output to a divide circuit 22, with the divided output from the VCO being providing simultaneously to a configuration switch 24 and to a one-shot multibibrator 26, as well as to one input of a phase detector 28. The output from the one-shot 26 is provided through multiplexer 30 to either of two amplifiers 34 and 36. The output of amplifier 34 is coupled to the upstream transducer 4a and the output of amplifier 36 is provided to the downstream transducer 4b. The output of the one-shot multivibrator 26 is also provided to delay circuit 38 whose output is provided to automatic gain control amplifier 40 in receiver 41 and to a comparison zero crossing detector 44. The inputs to the automatic gain control amplifier 40 are received from, either amplifier 46 coupled to the output from transducer 4a, or from amplifier 48, coupled to the output from transducer 4b. The output from the zero crossing detector is provided as an input to the phase detector 28. The output from the one-shot multivibrator 26 is provided as a reset signal to the phase detector 28.

The output from the phase detector 28 is coupled through differential integrator 50 to a multiplexer 52 at the control input of the VCO 20. Multiplexer 52 provides a switching function to couple either one of two capacitors 56 or 58 to the control input of VCO 20.

A relatively high frequency (10 MHz) clock 60 is coupled through logic circuit 62 to either upstream 24 bit counter 66 or downstream 24 bit counter 68. The outputs from the counters 66 and 68 are coupled through a buffer stage 70 to a computer (not shown).

The operation of the circuit of FIG. 3 is best understood in conjunction with the timing diagrams of FIGS. 4 and 5. In operation the VCO 20 provides an output signal illustrated in FIG. 4 in which the down-going edge of the waveform after passing through divider 22 (which for purposes of this initial discussion will be considered to have a dividing factor of one) triggers one shot multivibrator 26 which produces the transmit pulse. The same waveform edge provides a signal to a flip-flop circuit, $FF_1$ and $FF_2$ resetting them in the phase detector 28. The transmit pulse is passed to multiplexer 30, which depending upon which control signal it is receiving from the configuration switch 24, passes that signal from the one shot multivibrator 26 to amplifier 34 to initiate an ultrasonic pulse from transducer 4a or, in the other mode, passes that same pulse through amplifier 36 to transducer 4b to initiate an ultrasonic pulse in the opposite direction. Configuration switch 24 operates to change the state of the entire circuit to operate in one mode to determine the time period $t_1$ for upstream interrogations, or, in the other mode the time period $t_2$ for downstream interrogations. The quantity by which the divide circuit 22 divides the output from the VCO 20 defines the number of cycles N for which the transit time is measured. Thus the configuration switch 24 switches back and forth between upstream and downstream, counting every N cycles from the VCO 20.

The operation of the overall circuit of FIG. 3 is to control the VCO such that it is operating at a frequency which is equal to ½ the system frequency, where the system frequency is a frequency whose period equals the time of flight of an ultrasonic pulse from one transducer to the other. Basically, this is accomplished by detecting the zero crossings of received pulses in the zero crossing detector 44 and supplying them to a flip-flop circuit, $FF_2$ in the phase detector 28, with this phase detector determining which came first, the rising edge of the $FF_1$ output or the rising edge of the received frequency $FF_2$ output. This phase detector 28 then provides an output pulse, whose width is the difference in the arrival time of the two edges, to either the plus or minus input of the differential integrator 50. It is the output of this differential integrator 50 applied through multiplexer 52 which is the frequency controlling input to the VCO 20.

As the width of the phase detector output pulse approaches zero, the VCO frequency will approach half of the system frequency and the circuit becomes locked with the VCO output frequency tracking the system frequency. Since the phase detector is always reset at the same time that the falling edges of the transmit and receive frequencies are generated, it will always phase detect the succeeding two edges which are the 50% duty cycle point of the transmit frequency and the zero crossing detected output of the received pulse. This insures that the entire circuit will not lock on harmonics of either the receive or transmit frequencies and that every interrogation of the flow will yield correction information. This feature provides for very fast tracking of the system frequency (which it will be understood changes with changes in the flow velocity) and enables non 50% duty cycle frequencies to be phase detected.

The circuit operating in this fashion usually disregards transducer ringing signals because the 50% duty cycle halves the pulse repetition frequency, compared to a traditional singaround. This means that the time between transmit is exactly twice the time of flight, allowing twice the time for the ringing to decay.

In order to cancel the effects of triple or multiple transit reflections of the ultrasonic waves, or unusually long ringdown times (e.g., in buffer rods) the circuit may be configured to skip a number M of transmitted ultrasonic pulses to thereby allow enough time for multiple transits to die out while maintaining the VCO at exactly ½ the system frequency. This is accomplished by utilizing the divider 22 for a relatively high number M of cycles. Thus, after the 50% duty cycle edge of the transmit frequency and the received edge of the received frequency have been compared, another transmit pulse to the transducer is not initiated and therefore the flip-flops $FF_1$ and $FF_2$ are not reset until M cycles have passed. This is allowable because the phase detector will only operate on the two succeeding edges following the reset pulse. See FIG. 5.

For longer ultrasonic path lengths the time between the detected pulses increases and storage of the corrected VCO input voltages is mandated. This is accomplished by the differential integrator 50 which uses very high impedance field effect transistor switches to keep capacitor leakage low. The storage capacitors 56 and 58 are alternatively switched into the circuit, depending upon whether the measurement mode is upstream or downstream, as will be explained below.

With increased conduit diameters, the effects of reflections and ringing become small enough due to beam spreading attenuations or long times so that operation in the skip mode is not required. Upon receiving the ultrasonic signal (zero crossing), a new transmit is immediately initiated. At the same time a counter is incremented so that a total of N increments is used to accumulate N samples of the time of flight, whereas in the PLL incrementing a counter on each receive for N increments will yield 2 N samples (in twice the time for equal times of flight) of the time of flight. The number N is implemented by selecting a fixed divided output of divider 22. By dividing the VCO frequency directly, the regular mode and the skip mode will both yield the same number of times of flight for a given divisor.

As previously indicated, the output of the divide circuit 22 is used to toggle the configuration switch 24 changing the overall circuit from an upstream counting mode to a downstream counting mode. The output of the configuration switch 24 is indicated in one mode as a straight arrow and in the second as an arrow with a small circle. Throughout the circuitry this convention is applied so that the configuration of the multiplexers 30 and 52, as well as that of the logic circuit 62 and the gating of amplifiers 46 and 48 are all shown as controlled by the toggle output from the configuration switch 24. The output of the configuration switch 24 applied to the logic circuit 62 operates to gate the oscillator clock 60 away from the upstream 24 bit counter 66 to the downstream 24 bit counter 68. The numbers in these counters can then be used by a computer 75 to compute the velocity of flow V. By switching the multiplexer 52, the configuration switch 24 switches the capacitor used on the output from the differential integrator 50 and therefore allows one set of capacitors (each of the capacitors 56 and 58 is actually a pair of capacitors) to hold the control voltage for the upstream operation, and the other set of capacitors 58 is used to hold the control voltage for the downstream operation.

Any errors associated with the switching in and out of these capacitors and the subsequent need of a number of cycles to recharge the capacitors to the correct value are eliminated by only gating on the oscillator clock 60 to the counters for a particular number of counts at the end of a number of cycles of the VCO. In fact, any number of cycles of transmits can be ignored by these counters, and the computer will divide by only the number of cycles actually used to gate on the counters. Such a method allows the circuit to well establish its operating frequency before the counters are employed.

Another approach to changing the repetition frequency from that of a conventional singaround system is illustrated in FIG. 6. In FIG. 6 a dual slope approach employing a conventional dual slope circuit is shown. For example, if at the instant a first interrogating pulse is launched, a constant current source $I_1$ charges a capacitor at the rate $V_1$ volts/unit time, the initially uncharged capacitor will charge until the ultrasonic waves from the interrogating pulse are received at the second transducer at time $t_1$. But, instead of immediately launching another interrogating pulse as in the conventional prior art singaround systems, the second pulse is not launched until the capacitor has been fully discharged by a second constant current source $I_2$ flowing in the opposite direction at the rate $V_2$. If $V_2 = -V_1$, it takes just as long to discharge the capacitor as it did to charge it. When the capacitor has fully discharged to zero, only then will the second interrogation pulse be launched. In this arrangement, then, the repetition frequency has been reduced by a factor of two. By adjusting the dual slope ratio $V_2/V_1$, the repetition frequency can be reduced to any convenient value. Such reductions are typically in the range of 1:20. While no specific techniques for dual slope circuitry are described, such circuits are well known in the art.

The same technique can be employed to launch interrogation pulses at frequency higher than the conventional singaround. If the discharge rate $V_3$ is set equal to $-2V_1$, as in FIG. 6, and interrogating pulses are launched whenever a pulse is received at the transducer, and additionally whenever the capacitor $C_1$ has discharged to zero, then the pulse repetition frequency will be twice as fast as the system frequency.

The invention having been described, it will be apparent that other modifications and improvements may be suggested and the invention should be construed as limited only by the spirit and scope of the appended claims.

We claim:

1. An ultrasonic flowmeter for determining the velocity of flow of a fluid within a conduit comprising;
    a first transducer mounted on said conduit for transmitting ultrasonic waves into said fluid in response to applied electrical signals and for producing output electrical signals in response to ultrasonic waves received from said fluid,
    a second transducer mounted on said conduit at a location displaced from said first transducer in a direction parallel to the flow of fluid within said conduit, said second transducer transmitting ultrasonic waves into said fluid in response to applied electrical signals and producing output electrical signals in response to ultrasonic waves received from said fluid,
    a signal generating circuit coupled to said first and second transducers for applying electrical signals thereto, said signal generator circuit including a controlled frequency oscillator, the output of which controls the output repetition cycle of signals applied to said first and second transducer to initiate transmission of ultrasonic waves,
    a signal sensing circuit coupled between each of said transducers and a control input for said controlled frequency oscillator, said signal sensing circuit receiving electrical signals generated by said transducers in response to received ultrasonic waves and coupling said signals to said oscillator to control the frequency of said oscillator such that the output cycle period of said oscillator is proportional to the time required for an ultrasonic wave emitted by one transducer to travel to the other of said transducers,
    timing circuit means for determining the time for at least one cycle of said oscillator responding to ultrasonic waves transmitted through said fluid in the direction of said flow and for determining the time of at least one cycle of said oscillator responding to ultrasonic waves transmitted into said fluid in a direction opposite to said flow,
    said timing circuit means including a source of timing pulses operating at a frequency at least one order of magnitude higher than the frequency of said controlled frequency oscillator, said timing circuit means determining the number of said timing circuit pulses produced during said at least one cycle of operation of said controlled frequency oscillator, as a means of measuring the time of said cycle, and
    computer means for determining the difference between the said measured time for a said cycle while said ultrasonic waves are being transmitted in the direction of flow and the time required for said cycle when the ultrasonic waves are being transmitted opposite to the direction of flow, said difference being indicative of the flow velocity of said fluid.

2. A flowmeter in accordance with claim 1 wherein said timing circuit means determines the total time for a plurality N of cycles for ultrasonic waves in each direction, where N is an integer.

3. A flowmeter in accordance with claim 2 including a configuration switch having first and second modes, an upstream counter, and a downstream counter, wherein said upstream counter receives said timing pulses when said configuration switch is in its first mode, and wherein said downstream counter receives said timing pulses when said configuration switch is in its second mode, and means for switching said configuration switch from its first mode to its second mode for every N cycles of transmitted ultrasonic waves.

4. A flowmeter in accordance with claim 1 wherein said signal generator is arranged such that the signals are applied to said first and second transducers at only a fraction of the output frequency of said oscillator.

5. A flowmeter in accordance with claim 4 wherein said fraction is selected such that the time between application of said signals to said transducers is longer than the time for reverberations from the previously initiated transmission from one of said transducers to die out.

6. A flowmeter in accordance with claim 1 wherein the frequency of said oscillator is such that its period is one half the time required for an ultrasonic wave to travel from one transducer to the other.

7. A flowmeter in accordance with claim 1 and further including means for determining zero flow offset by interchanging transmitter and receiver cables during a period of constant flow velocity.

8. A flowmeter in accordance with claim 1 wherein N is selectable, independent of sound velocity, to optimize response time.

* * * * *

UNITED STATES PATENT AND TRADEMARK OFFICE
CERTIFICATE OF CORRECTION

PATENT NO. : 4,308,754

DATED : January 5, 1982

INVENTOR(S) : Norman E. Pederson, James E. Bradshaw, James E. Matson, Lawrence C. Lynnworth It is certified that error appears in the above–identified patent and that said Letters Patent are hereby corrected as shown below:

Column 2, last line, "$L=L_o(1=\alpha\Delta T)$ (8)" should read

--$L=L_o(1+\alpha\Delta T)$ (8)--

Column 3, line 30, "upstream-downw-" should read

-- upstream-down- --.

Signed and Sealed this

Fourth Day of October 1983

[SEAL]

Attest:

GERALD J. MOSSINGHOFF

Attesting Officer

Commissioner of Patents and Trademarks